(12) United States Patent
Pereira (10) Patent No.: US 11,688,267 B2
(45) Date of Patent: Jun. 27, 2023

(54) BEVERAGE TEMPERATURE MONITORING AND COMMUNICATION DEVICE AND METHOD

(71) Applicant: Renan Pereira, Orlando, FL (US)

(72) Inventor: Renan Pereira, Orlando, FL (US)

( * ) Notice: Subject to any disclaimer, the term of this patent is extended or adjusted under 35 U.S.C. 154(b) by 0 days.

(21) Appl. No.: 17/383,590

(22) Filed: Jul. 23, 2021

(65) Prior Publication Data

US 2023/0023139 A1 Jan. 26, 2023

(51) Int. Cl.
*G08B 21/18* (2006.01)

(52) U.S. Cl.
CPC .................................. *G08B 21/182* (2013.01)

(58) Field of Classification Search
CPC ................................................... G08B 21/182
USPC ............................................................ 340/584
See application file for complete search history.

(56) References Cited

U.S. PATENT DOCUMENTS

| | | | | |
|---|---|---|---|---|
| 5,897,207 A | * | 4/1999 | Hartmann | F25D 29/008 374/149 |
| 8,334,780 B1 | * | 12/2012 | Mendoza, Jr. | A47J 41/0094 340/584 |
| 9,581,384 B1 | * | 2/2017 | Scofield | F25B 21/02 |
| 9,792,409 B2 | | 10/2017 | Wernow et al. | |
| 9,868,377 B2 | * | 1/2018 | Kurtovic | B60N 3/104 |
| 11,565,927 B2 | * | 1/2023 | Lambrecht | B67D 1/0004 |
| 2003/0210141 A1 | * | 11/2003 | Iacovino | B65D 81/3879 340/539.1 |
| 2005/0035011 A1 | * | 2/2005 | McRobbie | B65D 51/245 206/217 |
| 2010/0084531 A1 | * | 4/2010 | Schuchman | B60N 3/103 248/311.2 |
| 2012/0193347 A1 | * | 8/2012 | Schwartz | F24V 30/00 126/263.05 |
| 2013/0145324 A1 | * | 6/2013 | Kelly | G06F 1/1686 715/846 |
| 2015/0100167 A1 | * | 4/2015 | Sloo | G08B 29/02 700/278 |
| 2015/0245421 A1 | * | 8/2015 | Heczko | H05B 6/1245 99/323.3 |
| 2015/0274300 A1 | * | 10/2015 | Moore | A47G 23/0225 248/229.1 |
| 2015/0297779 A1 | * | 10/2015 | Conroy | B05B 7/2416 239/74 |
| 2016/0040903 A1 | * | 2/2016 | Emmons | G05B 15/02 700/278 |
| 2016/0131533 A1 | * | 5/2016 | Parker | G01K 1/14 374/150 |
| 2016/0183730 A1 | * | 6/2016 | Bedi | A47J 36/2466 219/442 |
| 2017/0000275 A1 | * | 1/2017 | Brown | G09F 23/0091 |

(Continued)

FOREIGN PATENT DOCUMENTS

| | | |
|---|---|---|
| CN | 104382742 A1 | 3/2015 |
| WO | 2017/075298 A1 | 5/2017 |
| WO | 2017/085073 A1 | 5/2017 |

*Primary Examiner* — Zhen Y Wu (57) ABSTRACT

A device for monitoring temperature of a beverage and for communicating data, the device comprising: a housing portion configured to be oriented adjacent to a drink in a drink sleeve; a thermal sensor coupled to said housing portion and oriented to take temperature readings of the drink in the sleeve; and a wireless transceiver coupled to said thermal sensor and configured to transmit data representative of a temperature condition.

13 Claims, 11 Drawing Sheets

(56) References Cited

U.S. PATENT DOCUMENTS

| | | | | |
|---|---|---|---|---|
| 2017/0126873 A1* | 5/2017 | McGary | .............. | H04M 1/6066 |
| 2018/0042417 A1* | 2/2018 | Brown | ............... | A47G 19/2227 |
| 2019/0167034 A1* | 6/2019 | Walsh | ................ | B65D 81/3876 |
| 2019/0233197 A1* | 8/2019 | Myles | .................... | A47G 19/12 |
| 2019/0305424 A1* | 10/2019 | Wang | ..................... | H01Q 1/273 |
| 2020/0319035 A1* | 10/2020 | Keenan | .................. | B65D 23/16 |
| 2021/0348836 A1* | 11/2021 | Lauchnor | .................. | F25C 1/00 |

\* cited by examiner

BEVERAGE TEMPERATURE MONITORING AND COMMUNICATION DEVICE AND METHOD

TECHNICAL FIELD

The present disclosure relates generally to the field of temperature monitoring. More particularly, the present disclosure relates to a device and method for monitoring the temperature of a beverage and communicating that information to a remote device wirelessly.

BACKGROUND

It is understood that different types of beverages have preferred temperatures for consumption. For example, it is generally understood that white wine should be consumed at lower temperatures than red wines and that, in the United States, beer is preferably consumed while it is cold. Other beverages, including water, soda, and iced tea, may also be preferred at lower temperatures, while yet other beverages, including coffee and tea, may be preferred at higher temperatures.

While average consumers may find a range of temperatures acceptable for consuming a particular beverage, connoisseurs of such beverages may desire specific beverages to be within a much narrower range of temperatures at the time of consumption to optimize aroma and improve the flavor of the beverage. For example, it may be desired to consume Pinot Grigio in a temperature range of 45° F. to 50° F., and more particularly at 48° F. for a specific vintage. Similarly, it is generally agreed that beer should be served in a range of 38° F. to 55° F. with different types of beers being preferably served at different temperatures in this range. For example, lagers are generally served colder than ales with stronger beers being served at higher temperatures.

While some commercial restaurants and bars may have multiple refrigerators set at different temperatures to allow different beverages to be served at preferred temperatures, many such establishments, as well as the average consumer, may only have a single refrigerator and freezer operating at set temperatures, for example 40° F. for the refrigerator and 0° F. for the freezer, and thus, may not be able to readily determine that a beverage has reached a desired temperature. A device and method is therefore desired that can be used to provide notification that a beverage has reached a desired temperature. Such a device and method could be employed, for example, to allow a consumer of a beverage to rapidly cool a room-temperature beverage in a freezer and be notified when that beverage reaches the desired temperature.

SUMMARY

Disclosed in a first aspect herein is a beverage temperature monitoring and communication device including a housing portion configured to be oriented adjacent to a drink in a drink sleeve. A thermal sensor is coupled to the housing and oriented to take temperature readings of the drink in the sleeve. A wireless transceiver is coupled to the thermal sensor and is configured to transmit data representative of a temperature condition. The beverage temperature monitoring and communication device housing portion can be a first leg of a generally U-shaped housing. The housing can further include a second leg configured to maintain the thermal sensor in a desired orientation. In an alternate aspect the housing portion is coupled to the sleeve.

In yet another aspect, a system for monitoring and communicating the temperature of a beverage is disclosed that includes a sensor unit for monitoring the temperature of a beverage. The system includes a central hub for receiving communications from the sensor unit and transmitting said communications. The sensor unit includes a housing portion configured to be oriented adjacent to a drink in a drink sleeve, a thermal sensor coupled to the housing and oriented to take temperature readings of the drink in the sleeve, and a wireless transceiver coupled to the thermal sensor and configured to transmit data representative of a temperature condition.

In yet another aspect, a method of monitoring and communicating the temperature of a beverage is disclosed which includes the steps of taking a temperature reading of a drink with a sensor unit. The temperature reading is compared to a stored temperature value and a notification is pushed to a user interface when the temperature reading satisfies a threshold.

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

DETAILED DESCRIPTION

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

These drawings may not be drawn to scale and may not precisely reflect structure or performance characteristics of any given embodiment, and should not be interpreted as defining or limiting the range of values or properties encompassed by example embodiments.

Figure 1:
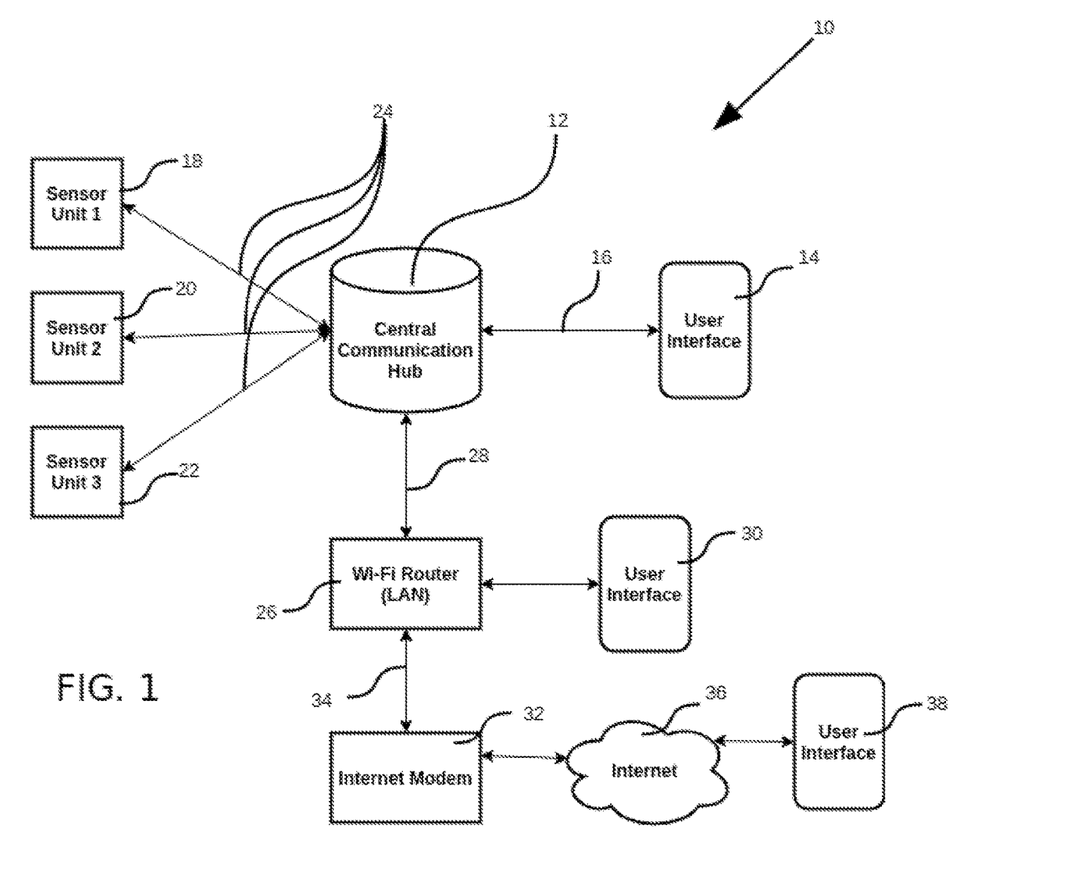
FIG. 1 is a block diagram illustrating an example of a temperature sensing system in accordance with one or more aspects of the present disclosure.

FIG. 1 is a block diagram illustrating a temperature sensing system 10 in accordance with various aspects of the present disclosure. The temperature sensing system 10 includes a central communication hub 12 in communication with a user interface 14 through a communication channel 16. It will be readily recognized that the user interface 14 can be located remote from the central communication hub 12 and that the communication channel 16 can be implemented via a wireless connection using a radio frequency connection, an infrared connection, or the like.

In some aspects of the disclosure, the communication channel 16 is provided via a radio frequency link such as the Bluetooth® protocol and, in a particularly preferred aspect, using the Bluetooth® Low Energy protocol. In alternate aspects of the disclosure, the user interface 14 can be integrated with the central communication hub 12 as an LED display, LCD screen, or the like, and the communication channel 16 can be a physical connection using any conventional means for transmitting data including a wire or data communication cable.

As further depicted in FIG. 1, the temperature sensing system 10 further includes a plurality of sensor units 18, 20, 22 communicating with the central communication hub 12 through one or more communication channels 24. The sensor units 18, 20, 22 can all be of the same type or can be comprised of different types of sensors as will be described herein.

In some aspects of the disclosure, the communication channels 24 are wireless connections provided via a radio frequency connection, an infrared connection, or the like. In a preferred aspect the communication channels 24 are provided via a Bluetooth® protocol and, in a particularly preferred aspect, using the Bluetooth® Low Energy protocol. In alternate aspects of the disclosure the communication channels 24 can be a physical connection using any conventional means for transmitting data including a wire or data communication cable.

As further depicted in FIG. 1, the central communication hub 12 is coupled to a Wi-Fi router 26 via a wired or wireless communication channel 28 as will be readily understood by those of skill in the art. The wireless router 26 can communicate with a user interface 30 on a local network. In an alternate aspect, the Wi-Fi router 26 may also be coupled to an internet modem 32 through a wired or wireless channel 34, as will be readily understood by those of skill in the art.

The internet modem 32 can be coupled over the internet 36 to a user interface 38 such as a smart phone.

In alternate aspects of the disclosure, one or more of the user interfaces 14, 30, 38 can be a mobile device, including a mobile phone or tablet, running an application for displaying the temperature of one or more beverages. In alternate aspects of the disclosure, one or more of the sensor units 18, 20, 22 can be configured to include wireless communication technology to communicate directly to one or more user interface 14, 30, 38. In yet further aspects of the disclosure, one or more of the Wi-Fi router 26 and internet modem 32 may be integrated with the central communication hub 12.

Figure 2:
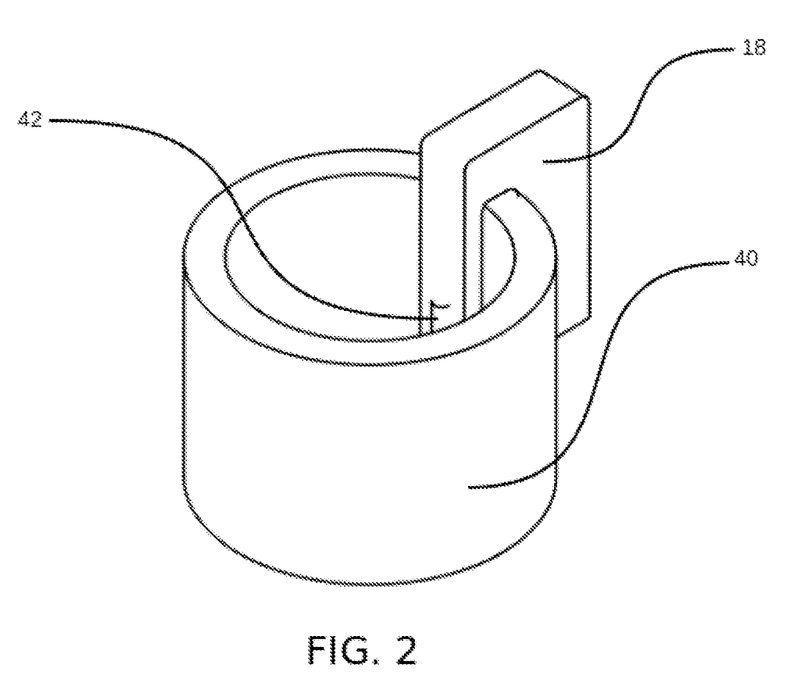
FIG. 2 is a perspective view of a sensor unit in accordance with aspects of the present disclosure.

As depicted in FIG. 2, in a preferred aspect of the disclosure the sensor unit 18 is configured generally in the shape of an inverted U having first and second legs, wherein one leg can be slid over the edge of a sleeve 40 placed around a drink. In this aspect a thermal sensor 42 is positioned at a surface of one leg of the sensor unit 18 and directed into the drink sleeve 40. As will be readily understood, in this arrangement, the sensor 42 is positioned to allow the thermal sensor 42 to take a temperature reading of a bottle or can inserted into the sleeve 40. In certain aspects the sleeve can be a drink Koozi®. In other aspects the sleeve can be a solid band that can be slid over a drink can or bottle. In other aspects the sleeve can be wrapped around the bottle or can and the ends fixed to each other by, in an exemplary embodiment, using hook and loop connectors. In one aspect, the thermal sensor is brought into contact with a bottle or can inserted into the drink Koozi® 40. It will be readily understood that the disclosure of this application can be used in connection with any suitable drink holder and is not limited in its application to a Koozi®.

Figure 3:
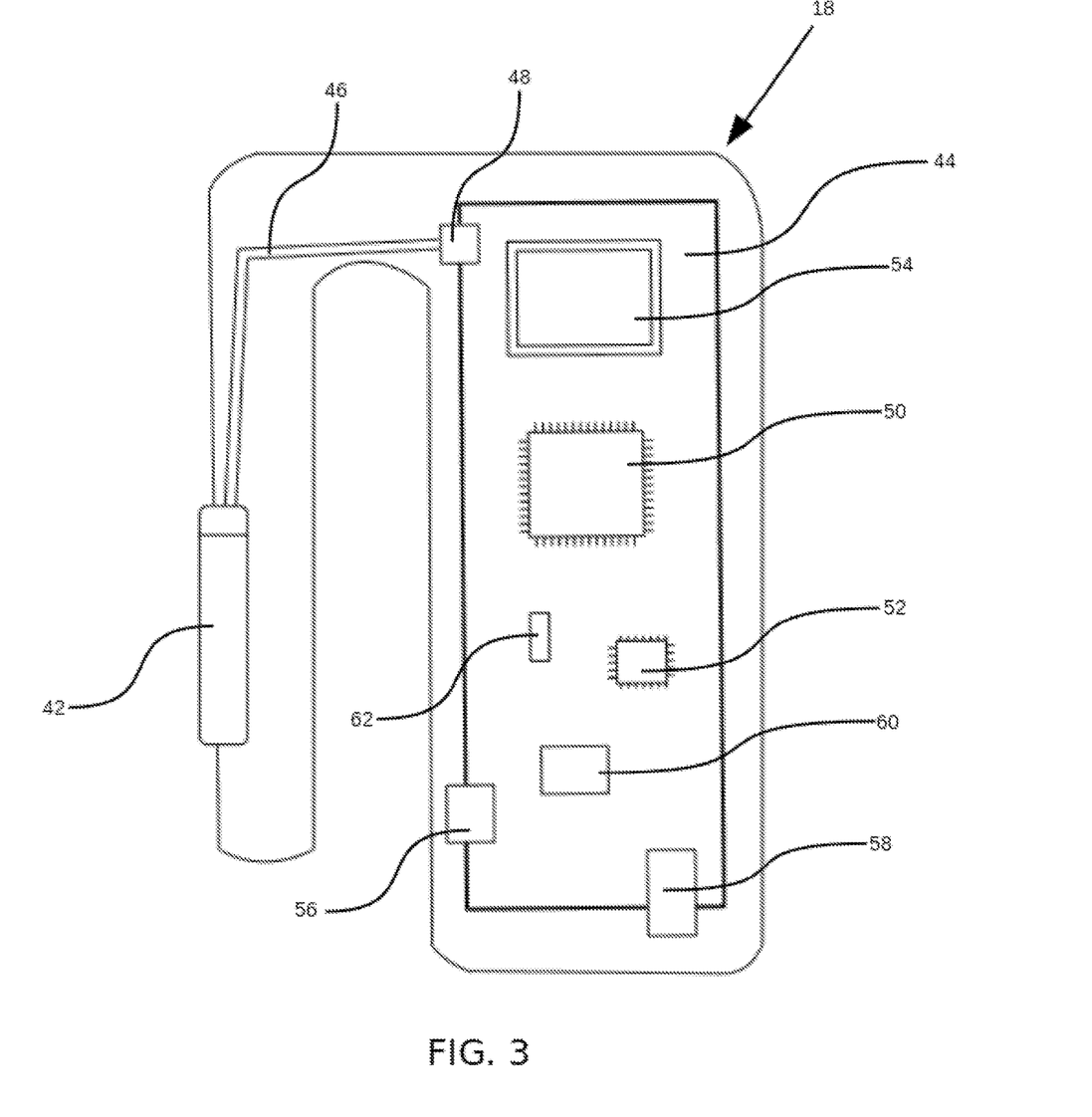
FIG. 3 is a cutaway view of the sensor of FIG. 2.

Further detail of the construction of the sensor unit 18 is provided in FIG. 3 in which the internal components of one aspect of the disclosure of the sensor unit 18 is shown. In this aspect, thermal sensor 42 is provided in one leg of the sensor unit 18 and coupled to a printed circuit board (PCB) 44 by a sensor lead 46 through a PCB connector 48. As further depicted in FIG. 3, the sensor unit 18 is provided with a microcontroller 50, a data storage device 52, wireless transceiver 54, battery connector 56 and wired communication and battery charging port 58, the purpose, coupling and operation of each of the foregoing components of the sensor unit 18 being readily understood by those of skill in the art.

As will be readily understood, the microcontroller 50 can implement a program to capture temperature readings using temperature sensor 42 and transmit a signal to a user interface 14, 30, 38 when a desired temperature is reached. In an alternate aspect, temperature readings can be pushed to the user interface 14, 30, 38 and the user interface can provide an alert to the user when a desired temperature is reached and/or provide continuous temperature updates to the user.

As will be readily understood by those of skill in the art, the program can be implemented in software and stored on data storage device 52, implemented in firmware in the microcontroller 50, or the like. The desired temperature can be fixed in the software or firmware of the sensor unit 18, if the sensor unit 18 is dedicated for use with a particular type of beverage, or, in a preferred aspect, can be selected by a user using a user interface 14, 30, 38 and transmitted wirelessly to the sensor unit 18 through the wireless transceiver 54 or downloaded to the sensor unit by a wired connection through the wired communication and battery charging port 58.

In certain aspects of the disclosure, the sensor unit 18 includes a component 60 that can be activated by the microcontroller 50 to emit a sound when, for example, the desired temperature of the beverage is reached. The component 60 can include a piezoelectric buzzer, sound chip, or the like and can be activated to emit any desire sound including spoken words or music. In some aspects of the disclosure, the sensor unit 18 can include a component 62 for emitting a light, such as an LED. In some aspects the light emitted by component 62 can be mounted to be visible through an opening in the casing of the sensor unit 18. In other aspects, all or a portion of the casing of the sensor unit 18 would be transparent or translucent and the light emitted by the component 62 would be visible through the casing. As will be readily recognized, the light emitted by the component 62, which can be a steady illumination or a flashing illumination, would be useful in identifying the beverage that has reached the desired temperature where multiple sensors are being used to track the temperature of multiple beverages.

It will be readily recognized that the sensor unit 18 can be implemented with all or only some of the components depicted in FIG. 3, in order to provide all or only some of the functionality described. In selecting the components and functionality to be included in the sensor unit 18, a device can be provided at a desired price point such as, for example, a single-use disposable sensor unit having limited functionality or a fully featured commercial device.

Figure 4:
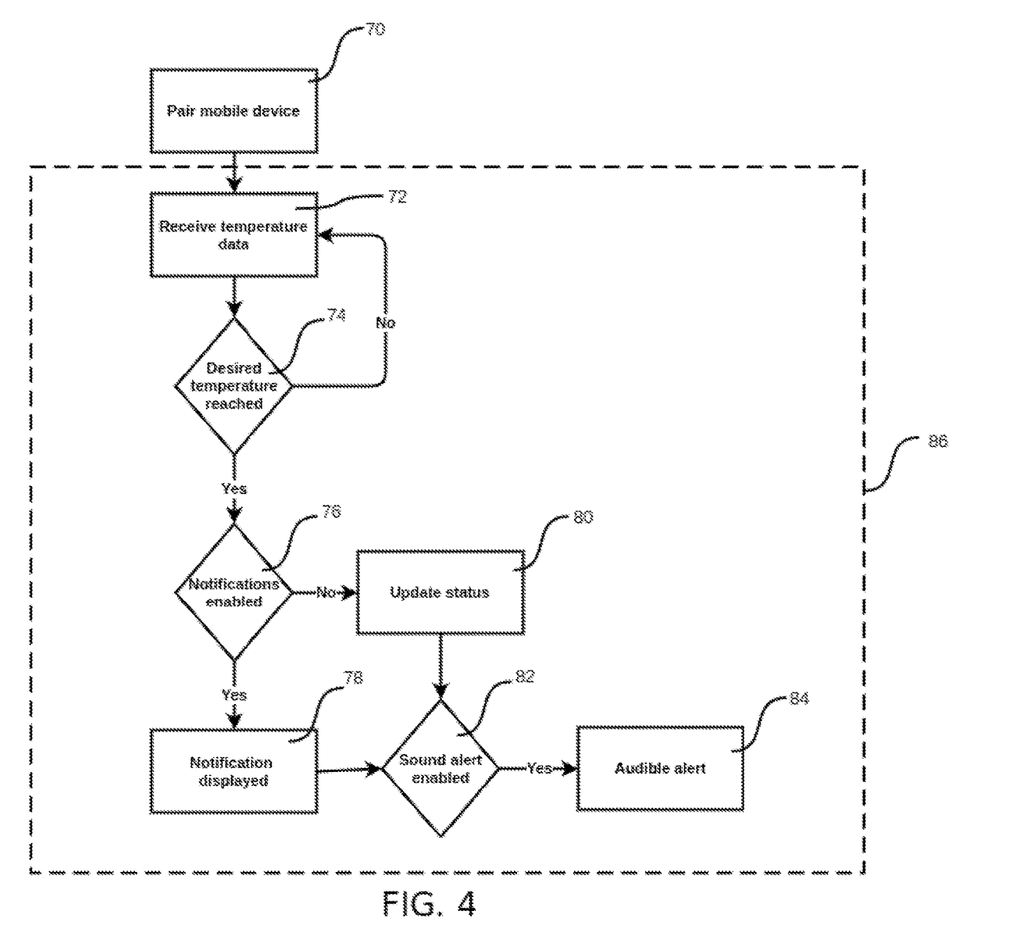
FIG. 4 is a flowchart depicting the steps performed by a software application implementing functions performed by components disclosed in FIG. 1.

A flowchart of steps of a program that may be implemented at a user interface 14, 30, 38 is depicted in FIG. 4. In one step 70, the user interface 14, 30, 38 is paired to a sensor unit 18. In an alternative aspect, the user interface 14, 30, 38 is paired in this step to the central communication hub 12. In an additional step 72 the user interface 14, 30, 38 receives a temperature reading transmitted by the wireless transceiver 54 of the sensor unit 18 and stores that reading in memory, such memory being, in some aspects, RAM, a data buffer, a persistent storage, such as a hard drive, or the like.

In a subsequent step 74, the temperature reading received at step 72 is compared to the desired temperature input by the user or temperature preset by user interface 14, 30, 38. If the temperature received at step 72 satisfies a threshold condition, for example, is equal to or below the desired temperature, where the user is seeking to cool the beverage, or equal to or above the desired temperature, where the user is seeking to heat up the beverage, the user interface 14, 30, 38 will return to step 72 and await an additional temperature reading from the sensor unit 18. When the temperature reading received at step 72 equals the desired temperature at step 74, the user interface program will check at step 76 if notifications are enabled and, if so, will alert the user that the desired temperature has been reached.

If notifications are not enabled, the user interface device 14, 30, 38 will be updated 80 to indicate that the desired temperature has been reached by providing, for example, an indication of that status on an LCD screen on the user interface device. Whether the user interface is updated to indicate that the desired temperature has been reached 80, or if an alert has been sent to the user by push notification, a sound alert may be enabled 82 and an audible alert provided to the user 84.

Figure 5:
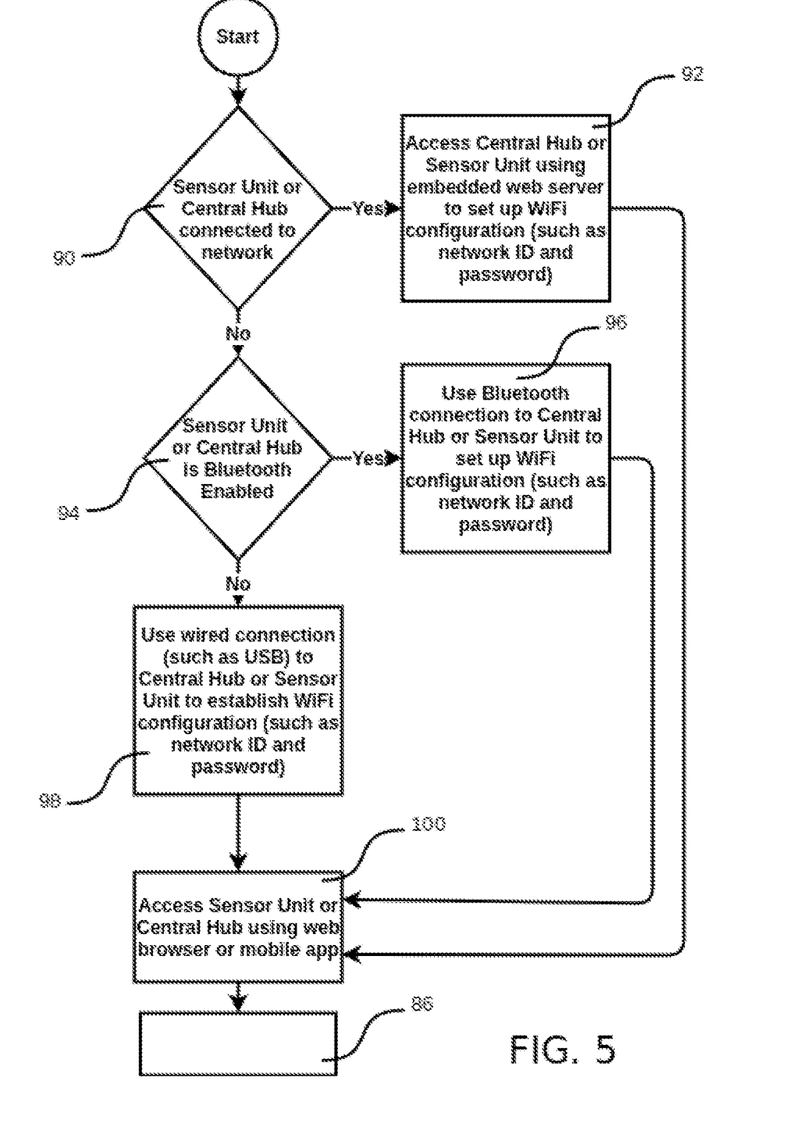
FIG. 5 is a flowchart depicting steps performed by a software application implementing functions performed by components disclosed in FIG. 1.

A process for configuration and operation of a temperature measurement system 10 having a Wi-Fi router 26 in accordance with one aspect of the present disclosure is described below in connection with FIG. 5. In accordance with this aspect, the central hub 12 is polled to determine if a connection to a Wi-Fi router exists 90. If such a connection exists, the central hub 12 can be accessed using an embedded web server to set up a Wi-Fi configuration 92 by, for example, establishing a network ID and password. If no connection to a Wi-Fi router exists, a determination is made whether a Bluetooth® connection with the central hub 12 can be established 94. If a Bluetooth® connection can be established with the central hub 12, that connection can be utilized by a user to set up a Wi-Fi configuration 96 by, for example, establishing a network ID and password. In one aspect of the disclosure, the central hub 12 is Bluetooth® enabled. In an alternate aspect a Bluetooth connection can be established with a sensor device 18 and that connection with the sensor device 18 provides a conduit through which a user can control the central hub to set up the Wi-Fi configuration 96.

If the central hub 12 is not connected to a network, and a direct or indirect Bluetooth connection cannot be established with the central hub 12, a Wi-Fi configuration can be established through a wired connection 98, such as through a USB connection, to the central hub 12 or sensor device 18. Once a Wi-Fi configuration has been set up using one of the foregoing steps, the sensor device 18 or central hub can then be accessed by a user device 30 using a web browser or mobile app 100. After access is established over the LAN, the temperature control system can be operated in accordance with the steps 86 set forth in FIG. 4.

Figure 6:
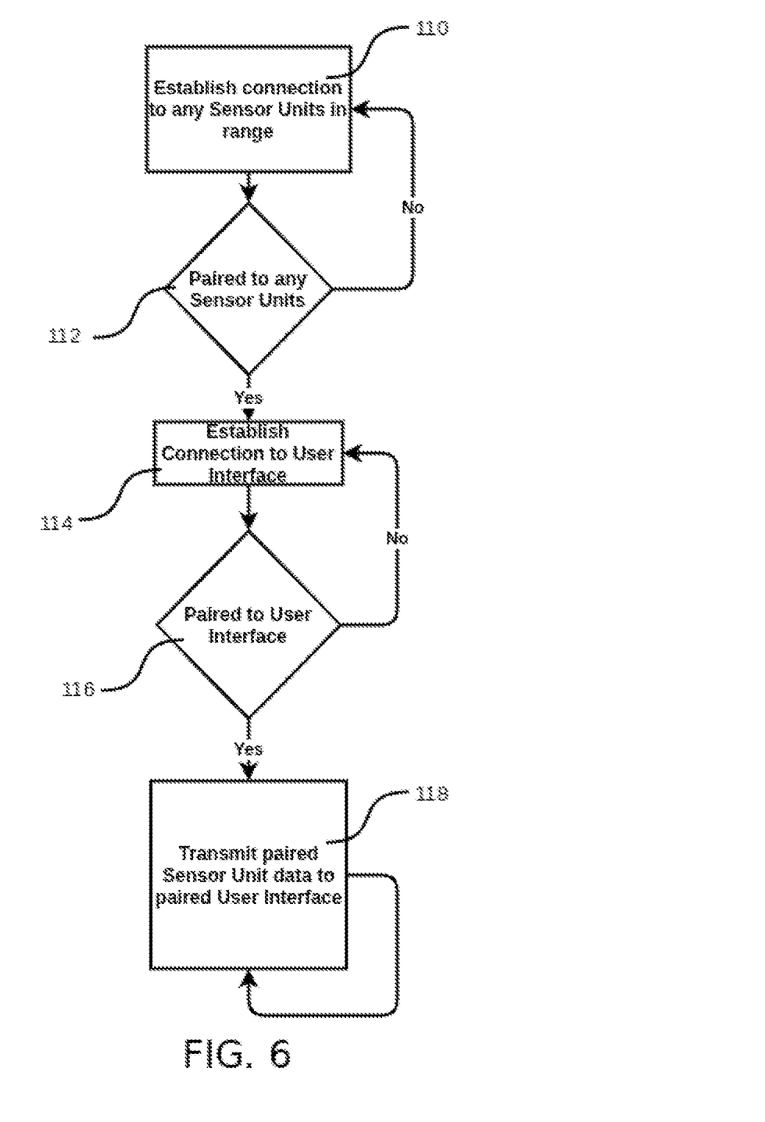
FIG. 6 is a flowchart depicting steps performed by a software application implementing functions performed by components disclosed in FIG. 1.

A flowchart of exemplary steps performed by the central hub 12 to establish a connection to one or more sensor units 18, 20, 22, and transmit temperature readings to one or more user interfaces 14, 30, 38 is depicted in FIG. 6. The central hub 12 will establish a wired or wireless connection to sensor unit 18, 20, 22 in step 110. In step 112 the central unit 12 verifies if connection to a sensor unit 18, 20, 22 has been established. If central hub 12 is not connected to a sensor unit 18, 20, 22 then step 110 is repeated until connection is established. If central hub 12 is connected to a sensor unit 18, 20, 22 then central hub 12 will establish a wired or wireless connection to user interface 14, 30, 38, as depicted in step 114.

In step 116 the central hub 12 verifies if connection to a user interface 14, 30, 38 has been established. If central hub 12 is not connected to a user interface 14, 30, 38 then step 116 repeats until a connection is established. If central hub 12 is connected to user interface 14, 30, 38 then central hub 12 will transmit data from connected sensor unit 18, 20, 22 to connected user interface 14, 30, 38.

As will be readily understood by those of skill in the art, the connection steps in FIG. 6 are not strict dependencies and can also be completed in different orders or simultaneously as steps 110 followed by 112 attempted in parallel with step 114 followed by 116, or step 114 followed by 116 occurring prior to step 110 followed by 112.

Figure 7:
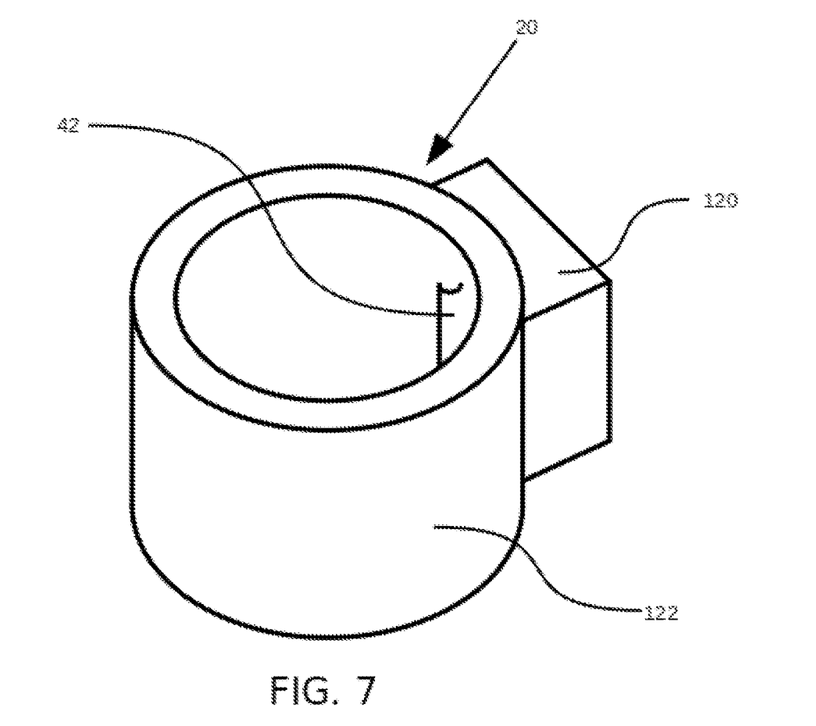
FIG. 7 is a perspective view of a sensor unit depicted as it might be used on a bottle.

As depicted in FIG. 7, in a preferred aspect of the disclosure the sensor unit 20 encompasses drink sleeve 122 coupled to an electronic component enclosure 120. In a preferred aspect, the drink sleeve 122 is made of a material which insulates temperature such as foam, rubber, or the like. As will be readily understood, in this arrangement the sensor 42 is brought into contact with a bottle or can inserted into the drink sleeve 122. As will be readily understood, the electronic component enclosure 120 can be implemented with some or all of the same components as depicted in FIG. 3, in order to provide some or all of the same functionality.

Figure 8:
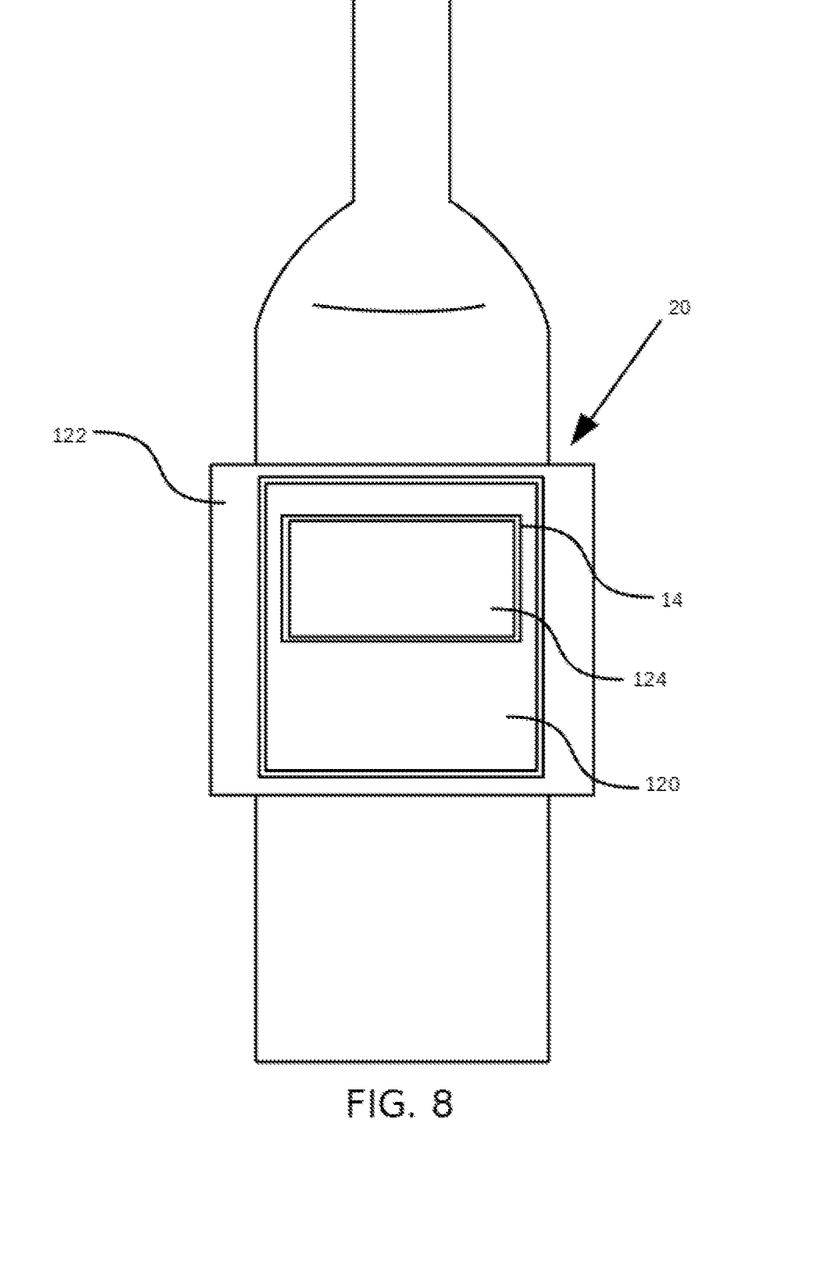
FIG. 8 is a plan view of the sensor unit of FIG. 7 provided on a bottle.

As depicted in FIG. 8, the sensor unit of FIG. 7 is shown as implemented in connection with a wine bottle. As shown in FIG. 8, the wine bottle is depicted as inserted into the drink sleeve 122 of sensor unit 20. In a preferred aspect of the disclosure, user interface 14 can be integrated with sensor unit 20 and can include an electronic component enclosure 120 that may include an LED display, LCD screen, or the like 124.

Figure 9:
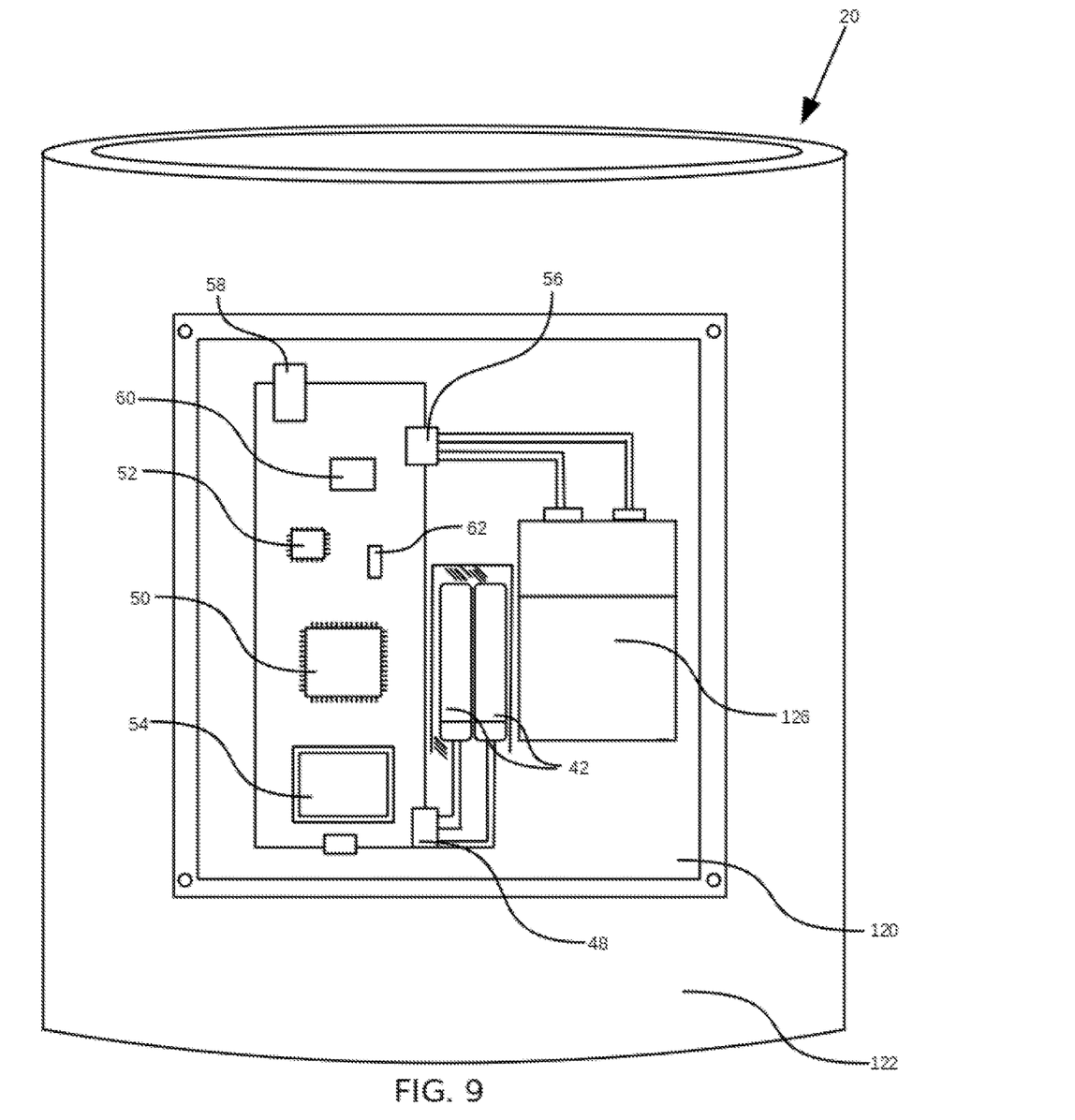
FIG. 9 is a cutaway view of the sensor of FIG. 7 in accordance with one aspect of the present disclosure.

Further detail of the construction of the sensor unit 20 is provided in FIG. 9 in which the internal components of one aspect of the sensor unit 20 is shown. As depicted in FIG. 9, an electronic component enclosure 120 is coupled to the drink sleeve 122. In this aspect, one or more thermal sensors 42 are connected to PCB Connector 48. As will be readily understood, in this arrangement, the one or more sensors 42 are brought into contact with a bottle or can when inserted into drink sleeve 122. As depicted in FIG. 9, the sensor unit 20 can include some or all of the same components 48, 50, 52, 54, 56, 58, 60, 62, as described in connection with FIG. 3, or similar components thereto, for providing some or all of the same functionality described in connection with FIG. 3. In a preferred aspect of the sensor unit 20 of FIG. 9, battery pack 126 can be coupled to the components contained on PCB Connector 56 and powers the unit.

As will be readily understood, multiple sensors 42 can be provided side-by-side, as depicted in FIG. 9, to provide redundancy. In other aspects, one or more sensors can be provided at different positions along the vertical length of the bottle or at different positions around the circumference of the bottle in order to provide temperature readings that can be compared using any desired algorithm such as, for example, a simple averaging. In other aspects, three or more temperature sensors can be utilized at different vertical and/or circumferential positions, to provide any combination of redundancy and/or comparative temperature readings.

Figure 10:
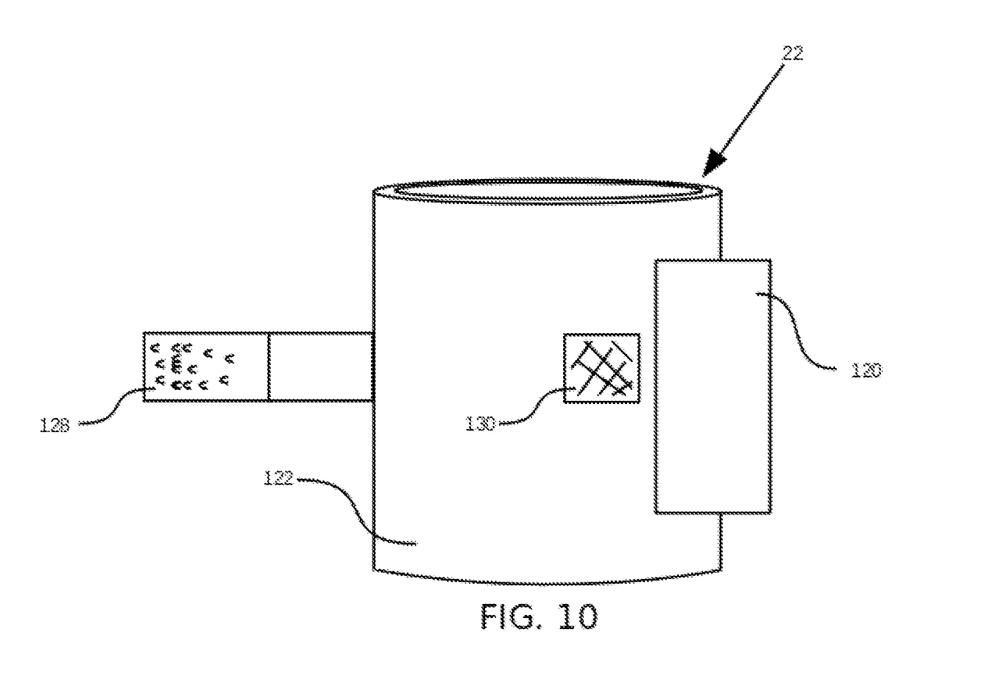
FIG. 10 is a perspective view of a sensor unit in accordance with a separate aspect of the present disclosure.

A sensor unit 22, in accordance with a separate aspect of the disclosure, is depicted in FIG. 10 where a drink sleeve 122 includes adjustable strap 128 to fit varying sizes of bottles, cans or the like by utilizing a fastener 130 such as, for example, a hook and loop strap 128 and fastener 130 such as Velcro®. As will be readily understood by those of skill in the art, attaching adjustable strap 128 to fastener 130 tightens the circumference around drink inserted into beverage sleeve 122.

Figure 11:
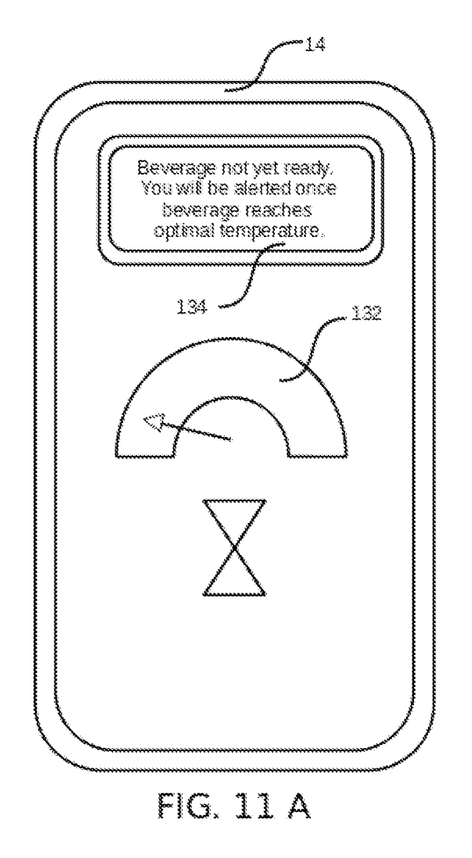
FIGS. 11A and 11B are plan views of a graphical user interface of a user interface device implementing a software application in accordance with aspects of the disclosure.

FIGS. 11A and 11B depict exemplary graphical user interface screens on a user interface 14. These exemplary graphical user interfaces provide temperature status, displayed to the user on a temperature gauge 132, on receipt of temperature data at step 72 as depicted in FIG. 4. On initial connection, user interface 14 will display a notification 134 informing the user that a subsequent alert 136 will display when a desired temperature is reached or exceeded. As depicted in FIG. 11B, when the desired temperature is reached or exceeded, the user interface 14 can display a different notification 136 indicating the updated status. As will be readily understood, the temperature gauge 132 of the graphical user interface can be updated only when the desired temperature is reached or exceeded, when any new temperature reading is taken by a sensor unit 18, 20, 22 and provided to the central communication hub 12, or directly to the user interface 14, or at any other desired interval.

Several embodiments of the disclosure are specifically illustrated and/or described herein. However, it will be appreciated that modifications and variations are contemplated and within the purview of the appended claims.

What is claimed is:

1. A drink temperature monitoring and communication device, comprising:
   a housing including a housing portion configured to be directed into a drink sleeve and oriented adjacent to the drink in the sleeve;
   a thermal sensor positioned in said housing portion and oriented to take temperature readings of the drink in the sleeve;
   a wireless transceiver coupled to said thermal sensor and configured to transmit data representative of a temperature condition; and
   wherein the housing portion is a first leg of a generally U-shaped housing, said housing further including a second leg configured to maintain said thermal sensor in a desired orientation.

2. The drink temperature monitoring and communication device of claim 1, further comprising a signaling device configured to signal when a desired temperature has been read by the thermal sensor.

3. The drink temperature monitoring and communication device of claim 2, wherein the signaling device is a light emitting diode (LED).

4. The drink temperature monitoring and communication device of claim 2, wherein the signaling device is a piezoelectric buzzer.

5. The drink temperature monitoring and communication device of claim 1, wherein the housing portion is coupled to the sleeve.

6. The drink temperature monitoring and communication device of claim 5, further comprising a second thermal sensor.

7. The drink temperature monitoring and communication device of claim 5, further comprising a signaling device configured to signal when a desired temperature has been read by the thermal sensor.

8. A system for monitoring and communicating a temperature of a drink, the system comprising:
   a sensor unit configured to monitor the temperature of the drink, and
   a central hub configured to receive communications from the sensor unit and to transmit said communications;
   wherein said sensor unit includes:
      a housing including a housing portion configured to be directed into a drink sleeve and oriented adjacent to the drink in the sleeve;
      a thermal sensor positioned in said housing portion and oriented to take temperature readings of the drink in the sleeve;
      a wireless transceiver coupled to said thermal sensor and configured to transmit data representative of a temperature condition; and
   wherein the housing portion comprises a first leg of a generally U-shaped housing, and wherein said housing further comprises a second leg configured to maintain said thermal sensor in an orientation.

9. The system of claim 8, wherein the housing portion further comprises a signaling device configured to signal when a desired temperature has been read by the thermal sensor.

10. The system of claim 8, wherein the housing portion is coupled to the sleeve.

11. The system of claim 10, wherein the housing portion comprises a second thermal sensor.

12. The system of claim 10, wherein the housing portion comprising the signaling device is configured to signal when a desired temperature has been read by the thermal sensor.

13. The system of claim 8 further comprising a second sensor unit configured to take temperature readings of a second drink and configured to transmit temperature readings to said central hub.

* * * * *